United States Patent
Polfer et al.

(10) Patent No.: US 6,665,779 B1
(45) Date of Patent: Dec. 16, 2003

(54) IMAGE BACKUP METHOD FOR BACKING UP DISK PARTITIONS OF A STORAGE DEVICE

(75) Inventors: Daniel A. Polfer, Winter Park, FL (US); Daniel L. Evers, Casselberry, FL (US); Thomas G. Halloran, Oviedo, FL (US); Michael D. Berhan, San Jose, CA (US)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/329,495

(22) Filed: Jun. 10, 1999

Related U.S. Application Data (60) Provisional application No. 60/113,582, filed on Dec. 24, 1998.

(51) Int. Cl.[7] .............................................. G06F 12/16
(52) U.S. Cl. ......................... 711/162; 711/112; 711/156
(58) Field of Search ........................ 711/111, 112, 155, 711/156, 161, 162

(56) References Cited

U.S. PATENT DOCUMENTS

| | | | | |
|---|---|---|---|---|
| 5,371,885 A | * | 12/1994 | Letwin | 707/205 |
| 5,544,356 A | * | 8/1996 | Robinson et al. | 707/205 |
| 5,706,103 A | * | 1/1998 | Matoba et al. | 101/3.1 |
| 5,907,672 A | * | 5/1999 | Matze et al. | 714/8 |

* cited by examiner

*Primary Examiner*—Matthew Kim
*Assistant Examiner*—Matthew D. Anderson
(74) *Attorney, Agent, or Firm*—Martine & Penilla, LLP (57) ABSTRACT

A method is provided for backing up data from a storage device having one or more partitions. Each partition has a plurality of clusters that include one or more sectors capable of storing data to be backed up. A number of sectors are specified for a block such that a partition to be backed up is defined in terms of a plurality of the blocks. A block map is then generated to indicate whether each of the blocks in the partition contains any data to be backed up. The block map is then traversed and the blocks that are indicated in the block map to contain the data are backed up from the partition while the blocks having no data are not backed up.

29 Claims, 11 Drawing Sheets

| BE0 flag = used | BE1 flag = used | BE2 flag = used | BE3 flag = unused |
| --- | --- | --- | --- |
| BE4 flag = used | BE5 flag = unused | BE6 flag = used | BE7 flag = used |
| BE8 flag = used | BE9 flag = unused | BE10 flag = unused | BE11 flag = used |
| BE12 flag = unused | BE13 flag = used | BE14 flag = used | BE15 flag = unused |
| BE16 flag = used | BE17 flag = used | BE18 flag = unused | BE19 flag = used |
| BE20 flag = unused | BE21 flag = used | BE22 flag = unused | BE23 flag = unused |

FIG. 5B

| BE0 Read flag = true | BE1 Read flag = true | BE2 Read flag = true | BE3 Read flag = false |
|---|---|---|---|
| BE4 Read flag = true | BE5 Read flag = false | BE6 Read flag = true | BE7 Read flag = true |
| BE8 Read flag = true | BE9 Read flag = false | BE10 Read flag = false | BE11 Read flag = true |
| BE12 Read flag = false | BE13 Read flag = true | BE14 Read flag = true | BE15 Read flag = false |
| BE16 Read flag = true | BE17 Read flag = true | BE18 Read flag = false | BE19 Read flag = true |
| BE20 Read flag = false | BE21 Read flag = true | BE22 Read flag = false | BE23 Read flag = false |

IMAGE BACKUP METHOD FOR BACKING UP DISK PARTITIONS OF A STORAGE DEVICE

CROSS REFERENCE TO RELATED APPLICATION

The present application claims benefit of U.S. Provisional Patent Application No. 60/113,582, entitled "Methods for Efficiently Performing Sector Skipping Backups," by Daniel A. Polfer et al., filed on Dec. 24, 1998. This application is incorporated herein by reference.

BACKGROUND OF THE INVENTION

1. Field of the Invention

This invention relates generally to disk drive backup systems and, more particularly, to image backup methods for backing up selected data from disk partitions of storage devices.

2. Description of the Related Art

Modern computer systems typically include one or more mass storage devices such as hard disk drives, optical disc drives, floppy disk drives, removable disk drives, and the like to store a large amount of information. Often, however, the storage devices fail to operate properly for various electromechanical defects. In the event of such failures, valuable data stored on the storage devices may be lost permanently or may require costly and time consuming repairs to recover the original data. To guard against such failures, modern computer systems typically employ a backup system to backup data stored on a storage device. When the storage device fails or original data becomes corrupted, the backup system uses the backed up data to restore the original data.

Generally, storage devices contain one or more disks for storing data. For example, hard disk drives typically include one or more disks arranged to store data. The hard disk drives include a plurality of sectors and may be partitioned into one or more partitions (e.g., volumes, logical drives, etc.) as is well known in the art. In addition, each of the disk partitions is a logically self-contained volume and is typically represented by a drive letter such as "C," "D," "E," or the like. Each partition contains files and directory bit maps such as file allocation table or the like. Typically, a partition is organized as a linear sequence of clusters, each of which is comprised of a number of sectors.

Figure 1A:
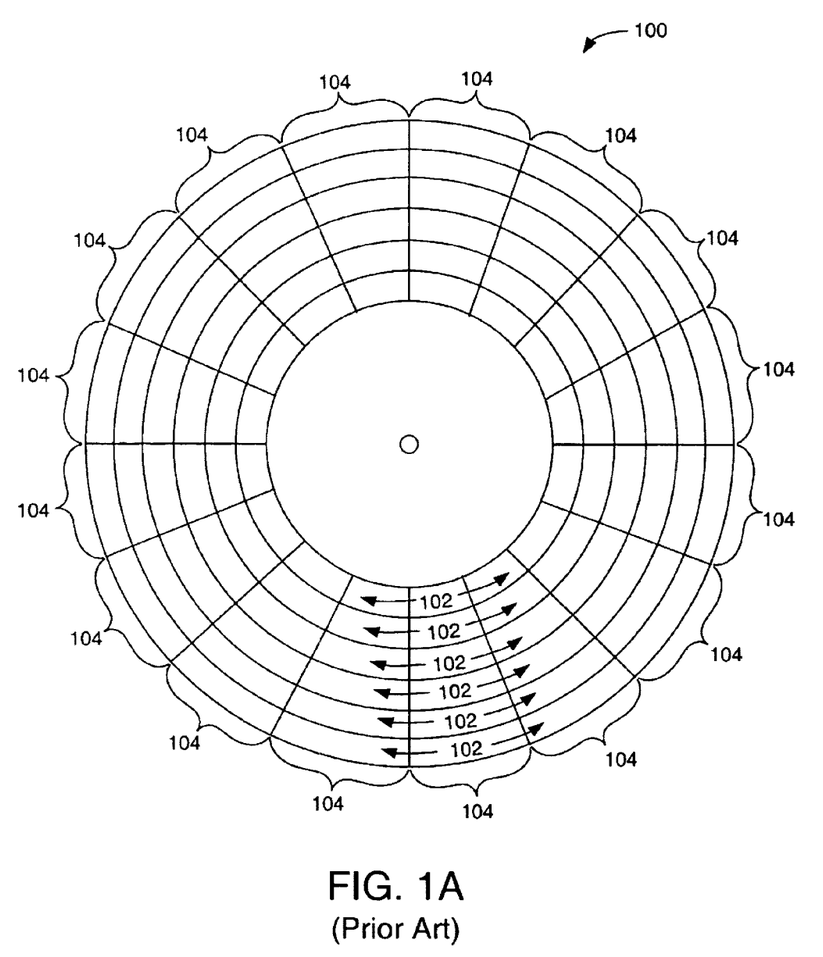
FIG. 1A illustrates a schematic diagram of an exemplary disk for storing data.

FIG. 1A illustrates a schematic diagram of an exemplary disk 100 for storing data. The disk 100 is configured to include a plurality of tracks 102. Each of the tracks 102 is divided into sectors 104 for storing data. The disk 100 may be partitioned into one or more partitions with each partition having a file allocation data structure such as a file allocation table.

Figure 1B:
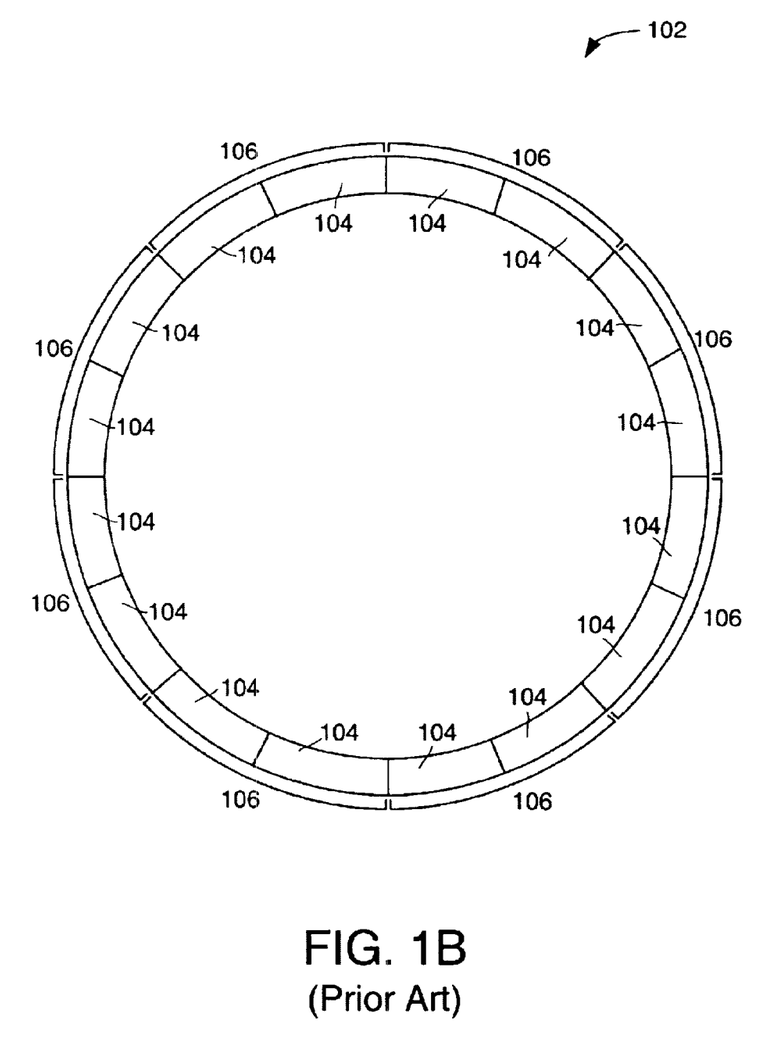
FIG. 1B shows a schematic diagram of an exemplary track divided into sectors.

FIG. 1B shows a schematic diagram of an exemplary track 102 divided into sectors 104. In this arrangement, files are configured to be stored in the disk 100 in units of clusters 106. Each of the clusters 106 includes a pair of sectors 104. As is well known in the art, however, a cluster may include any number of number of contiguous sectors typically in powers of two (e.g., 1, 2, 4, 8, 16, etc.).

In general, a cluster is the smallest allocation unit for a file as implemented in many operating systems (e.g., MS-DOS™, MS WINDOWS™, etc.). A file uses one or more clusters to store its data. For example, if a file is comprised of a single byte of data, a single cluster is allocated to store the file data. On the other hand, if the size of the file exceeds that of a single cluster, a plurality of clusters may be required to store the large file data.

Figure 1C:
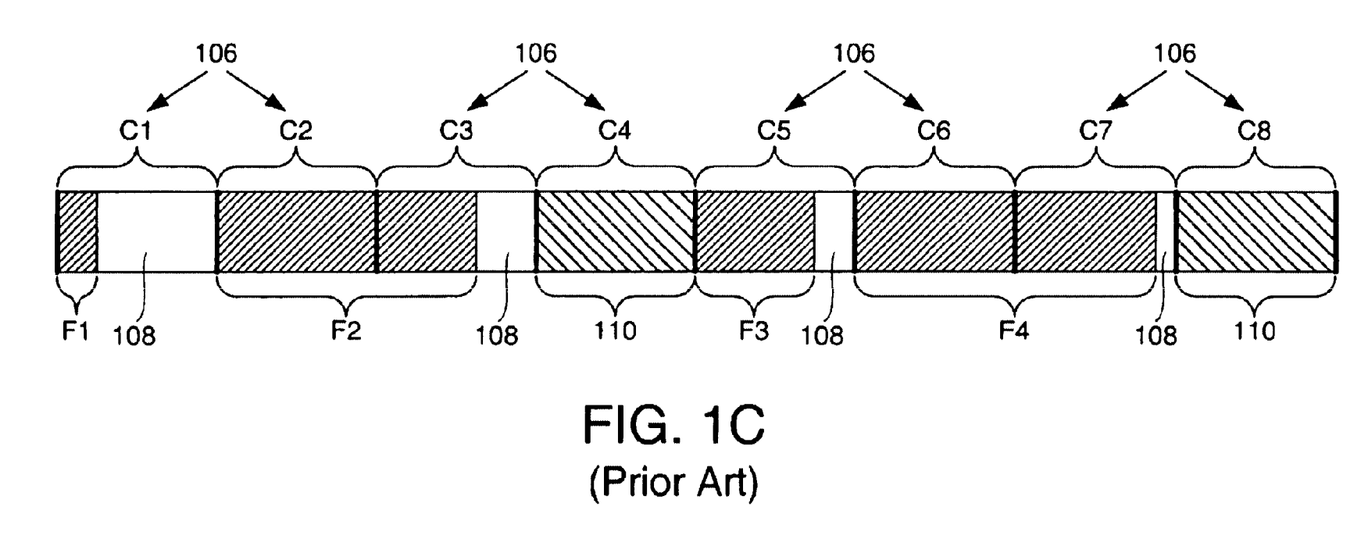
FIG. 1C shows a schematic diagram of a plurality of clusters used to store files.

FIG. 1C shows a schematic diagram of a plurality of clusters 106 used to store files F1, F2, F3, and F4. The clusters 106 are arranged sequentially in the order of clusters C1, C2, C3, C4, C5, C6, C7, and C8. The files F1 and F3 are smaller than a cluster size and are stored in clusters C1 and C5, respectively. On the other hand, the files F2 and F4 are larger than a cluster size and thus require more than a cluster to store them. For example, the file F2 is stored in the clusters C2 and C3 while the file F4 is stored in the clusters C6 and C7. The files F1, F2, F3, and F4 do not completely fill the clusters C1, C3, C5, and C7, respectively, so as to leave spaces 108 that are not used. However, in the absence of compression, these spaces 108 are typically not used to store data from other files. Since the clusters C1, C2, C3, C5, C6, and C7 are used to store valid file data, they are referred to herein as used-clusters, valid data space, or the like.

In contrast, the clusters C4 and C8 are not used to store valid file data and its spaces 110 are available for storing data. The spaces 110 corresponding to the unused clusters C4 and C8 are also referred to herein as "free spaces," "available spaces," "holes," or the like. The spaces 110 may be classified into two categories. On the one hand, the spaces 110 may contain zeros because the clusters have not been used to store data. On the other hand, the spaces 110 may include data from a file that has been previously deleted. In this case, the spaces may include non-zero or garbage data. In either case, the spaces represent unused spaces or clusters where data may be written to.

Operating systems in modern computer systems typically keep track of the free spaces by means of free list, bit map, or the like. For example, conventional bit maps provide a bit for each allocation unit (e.g., cluster) indicating whether the associated allocation unit is available or not for writing data. In this manner, when new data are to be written to a disk, the operating system checks the bit map and determines one or more available allocation units to write the data. The free list or bit map is generally provided in a file allocation data structure (e.g., file allocation table or FAT) for each partition and is well known in the art.

Back up techniques typically fall into two broad categories: file-based backup and image-based backup. In file-based backup systems, the contents of individual files are copied from a source disk to a backup media. The files are usually copied without regard for how they are arranged on the source disk. For example, a partition may have ten sectors containing two files. One file is stored in sectors two through four and sectors eight and nine while the other file is stored in sectors five through seven. The remaining sectors zero and one are unused. In this case, the file-based backup would store information in the backup in the following sequence: sectors two through four, eight and nine, five through seven, such that the unused sectors zero and one are not copied.

However, since a partition or drive often includes hundreds or even thousands of files, backing up all files of the entire partition or drive may require a substantial number of non-sequential read and write operations. For example, to back up the former file in sectors two through four and sectors eight and nine, a backup system reads sectors two through four first, and then performs a seek to sector eight for reading sectors eight and nine. Such non-sequential read and write operation entails numerous seek operations to proper sectors of clusters. Accordingly, the conventional file backup method may require a substantial amount of time to backup the entire partition or drive.

By comparison, the image-based backup method generally reduces the time required to backup an entire partition. Image-based backup systems operate on a partition or drive basis and are capable of backing up a disk or one or more partitions of the disk. In this method, all data on the partition, including valid data, free space, and invalid data, are copied and stored on a backup medium. For example, to perform an image backup of a partition "C," the image-based backup method operates to read and store the data on the partition sequentially from beginning sector to the end. By thus reading and storing the sectors linearly, seek operations are minimized. Hence, the backup time is typically reduced in comparison with the file-based backup technique.

Unfortunately, the conventional image-based backup methods have several drawbacks. For example, since conventional image backup systems typically store all data including valid data, free space, and invalid data, a substantial portion of the backup medium may be used to store unnecessary data such as the invalid data and the free space data, which typically consists of zeros. To the extent that a partition has a relatively high percentage of free space, the conventional backup systems may exhibit a correspondingly low efficiency in backing up data.

In addition, a partition typically accumulates more invalid data the longer it has been in use. The increase in the accumulation of invalid data results from, over time, more data being written to the partition and then overwritten or erased by other data. Thus, the conventional image backup methods may store a substantial amount of invalid data as well as free space data, thereby unnecessarily adding to the backup time.

In view of the foregoing, what is needed is an image backup method for backing up the data of one or more partitions or drives while minimizing the backup of free space data and/or invalid data.

SUMMARY OF THE INVENTION

The present invention fills these needs by providing a method for backing up data from a disk partition using a block map. It should be appreciated that the present invention can be implemented in numerous ways, including as a process, an apparatus, a system, a device, a method, or a computer readable medium. Several inventive embodiments of the present invention are described below.

In accordance with one embodiment, the present invention provides a method for backing up data from a storage device having one or more partitions. Each partition has a plurality of clusters that include one or more sectors capable of storing data to be backed up. A number of sectors are specified for a block such that a partition to be backed up is defined in terms of a plurality of the blocks. A block map is then generated to indicate whether each of the blocks in the partition contains any data to be backed up. The block map is then traversed and the blocks that are indicated in the block map to contain the data are backed up from the partition while the blocks having no data are not backed up. Preferably, the block map is generated by determining, for each block, whether any cluster in the block includes any data to be backed up by traversing a file allocation table of the partition.

In another embodiment, a method is provided for backing up data from a storage device having one or more partitions. Each partition has a file allocation table and a plurality of clusters. The file allocation table includes a cluster entry for each of the clusters in the partition to indicate whether each cluster has any valid data for backup. Each of the clusters has one or more sectors capable of storing data to be backed up. A block is defined to include N contiguous clusters such that a partition to be backed up is specified in terms of M blocks. The N clusters in the blocks provides a specified backup granularity. The file allocation table is traversed to determine if any cluster entries in each of the blocks indicate that the associated block contains data to be backed up. In particular, a block is indicated to contain the data to be backed up when any cluster entry in the block is indicated as having any data to be backed up. A block map having M block entries corresponding to the M blocks is generated. The block map includes one block entry per block. Each of the M block entries indicates whether the associated block in the partition contains the data to be backed up. In response to the block map, only the blocks indicated to be containing the data to be backed up are backed up.

By selectively backing up only the blocks having valid data, the present invention substantially reduces the amount unused spaces that are backed up and thereby saves significant time that otherwise would be needed to backup the free spaces in image backup operations. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details or by using alternate elements or processes. In other instances, well known processes, procedures, components, and circuits have not been described in detail so as to not obscure aspects of the present invention.

The examples provided herein describe a system whose clusters occur on boundaries such that they fall wholly within the block size employed by the invention. This case is used for simplicity and clarity, but such boundary alignment is not a requirement or limitation of the present invention.

The present invention provides methods for performing image backups of one or more disk partitions by generating a block map to identify blocks of clusters that are to be backed up. Specifically, the partition to be backed up is specified in terms of blocks by assigning one or more clusters to the blocks. Then, the present invention generates a block map that maps each of the blocks to a flag, which indicates whether the associated block is to be backed up or not. Blocks that contain any useful data are to be backed up while blocks containing no data are not to be backed up. Then, the present invention traverses the block map, block by block, and backs up only the blocks in the partition that are indicated to be backed in the block map. In this manner, the present invention saves significant space and time in performing image backup of partitions.

In a preferred embodiment, the present invention is implemented in a computer system running operating systems such as WINDOWS™, WINDOWS NT™ that provide a file system. However, it should be appreciated that the present invention can be used with any suitable operating systems (e.g., DOS, UNIX™, and Linux™ operating systems), which provide a file system for keeping track of used spaces (e.g., valid data space) and free spaces (e.g., unused space) on a storage device to be backed up. The storage device may contain one or more disks for storing data and is preferably a fixed disk drive such as a hard disk drive. However, those skilled in the art will appreciate that the present invention may also be used to backup data in other types of storage devices such as optical discs, removable disk drives, etc.

A fixed disk drive is a storage device with non-removable internal media and a relatively large storage capacity. The fixed disk drive may be partitioned to form smaller logical disk drives, i.e., partitions, which is a grouping of a single contiguous range of sectors on the fixed disk. For example, a user may partition a one Gigabyte fixed disk drive into two logical 500 Megabyte disks that are designated as "C:" and "D:" drives. In each partition, up to $2_N$ contiguous sectors may be grouped to define a cluster, where N is an integer greater than or equal to zero.

A partition contains files and directory bit maps such as file allocation table or the like. As used herein, the term "partition" refers to the smallest backup unit for image backup purposes and may be a subset of a larger "drive" or "disk." Although the present invention is illustrated by means of partition, it is equally applicable to larger units such as the drive or disk that may contain a plurality of partitions.

Figure 2:
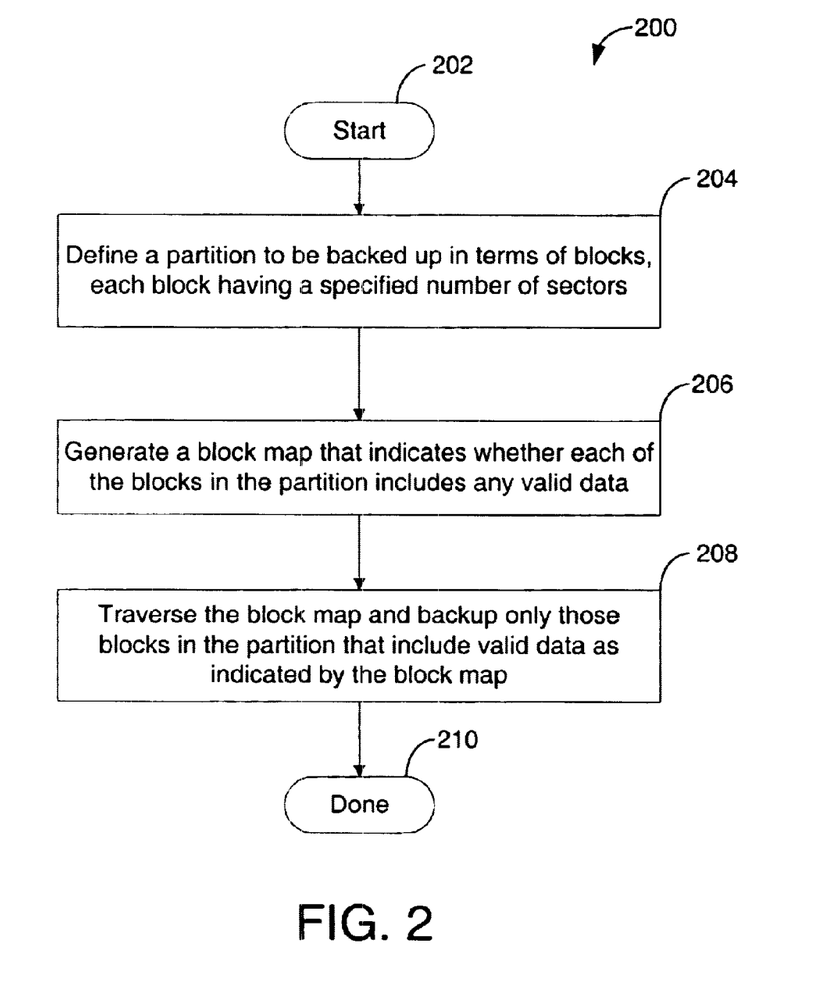
FIG. 2 illustrates a flowchart of an exemplary method for backing up a partition in accordance with one embodiment of the present invention.

FIG. 2 illustrates a flowchart of an exemplary method 200 for backing up a partition in accordance with one embodiment of the present invention. The partition to be backed up includes a plurality of sectors with one or more sectors forming a cluster. The method 200 begins in operation 202 and proceeds to operation 204, where a partition to be backed up is defined in terms of blocks with each block having a specified number of sectors. Since a cluster consists of sectors, a block may also be implicitly defined in terms of clusters. In a preferred embodiment, each of the blocks includes an equal number of clusters, each of which, in turn, includes one or more contiguous sectors. Hence, a set of contiguous sectors is assigned to each of the blocks. The size of a block, in terms of clusters or sectors, is programmable by a user to obtain a desired granularity. For example, given that a partition has a total of P sectors, which are defined in equal sized blocks of B sectors each, then, the partition will have M blocks where $M=[(P+B-1)/B]$. Accordingly, any suitable number of clusters or sectors may be assigned to a block to provide a flexible backup granularity.

Once the partition has been specified in units of blocks, a block map is generated, in operation 206, to indicate whether each of the blocks in the partition includes any data (e.g., valid data, used data space) to be backed up. The block map includes an entry for each of the blocks to indicate whether the associated block has any data to be backed up. Preferably, each entry includes a flag that indicates whether all the clusters or sectors in the associated block are unused (i.e., available) spaces or used spaces containing valid data. If any sector in a block includes any valid data, then the entire block is to be backed up. On the other hand, if no sector in the block includes any valid data, then the block is not to be backed up. Based on these criteria, the flags are set for the blocks in the partition by traversing a file allocation table of the partition. Alternatively, the flags may be set by sequentially reading the sectors in the partition. However, this alternative method may be less effective in determining un-needed clusters.

Then, in operation 208, the block map is traversed and only those blocks that contain data to be backed up as indicated in the block map are backed up from the partition. That is, all the blocks having any valid data as indicated by the flags are read and backed up. Conversely, the blocks indicated by the flags as having no data to be backed up are not read from the partition for backup. In this manner, all sectors in a block can be skipped for backup purposes when they contain no useful data for backup. Accordingly, the present invention reduces substantial backup space and time that would have been needed for backing up the unused blocks. The method 200 then terminates in operation 210.

Figure 3A:
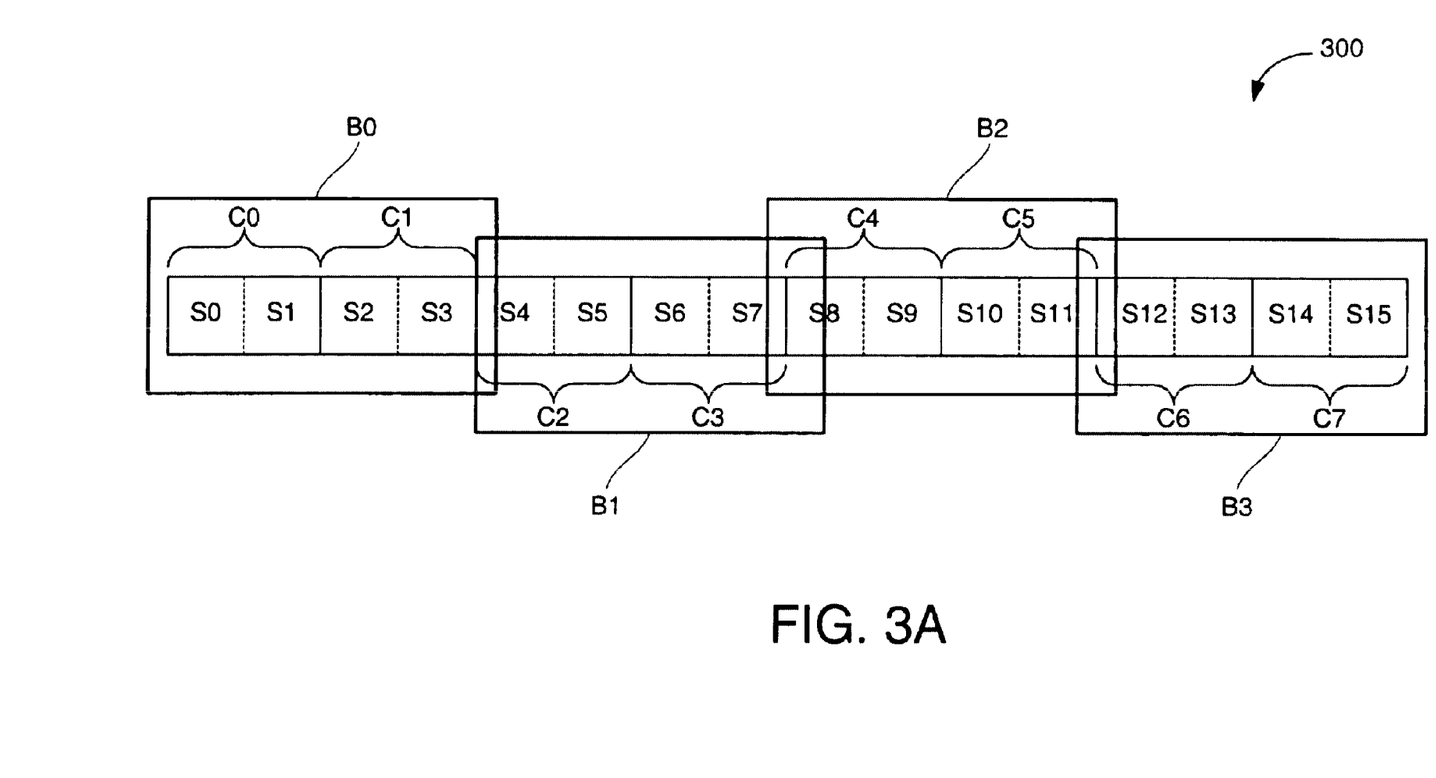
FIG. 3A shows a schematic diagram of sectors organized as clusters of a partition for depicting exemplary blocks in accordance with one embodiment of the present invention.

FIG. 3A shows a schematic diagram of a beginning portion of a partition 300 organized in exemplary sectors, clusters, and blocks in accordance with one embodiment of the present invention. The partition 300 includes a sequence of sectors from S0 through S15. In the illustrated partition 300, a cluster (e.g., C0, C1, C2, C3, etc.) is comprised of a pair of contiguous sectors. For example, a cluster C0 is formed of sectors S0 and S1; a cluster C1 is formed of sectors S2 and S3; and so on. In addition, a block (e.g., B0, B1, B2, B3, etc.) is shown to include a pair of contiguous clusters. For instance, a block B0 is formed of clusters C0 and C1; a block B1 is formed of clusters C2 and C3; and so on. Preferably, all clusters include a same number of sectors and all blocks include a same number of clusters. The partition 300 may be organized in any suitable numbers of sectors, clusters, and blocks to implement the present invention. Although the block structure is illustrated using such sector and cluster structures, those skilled in the art will appreciate that it may implement any suitable number of sectors and clusters in a block.

Figure 3B:
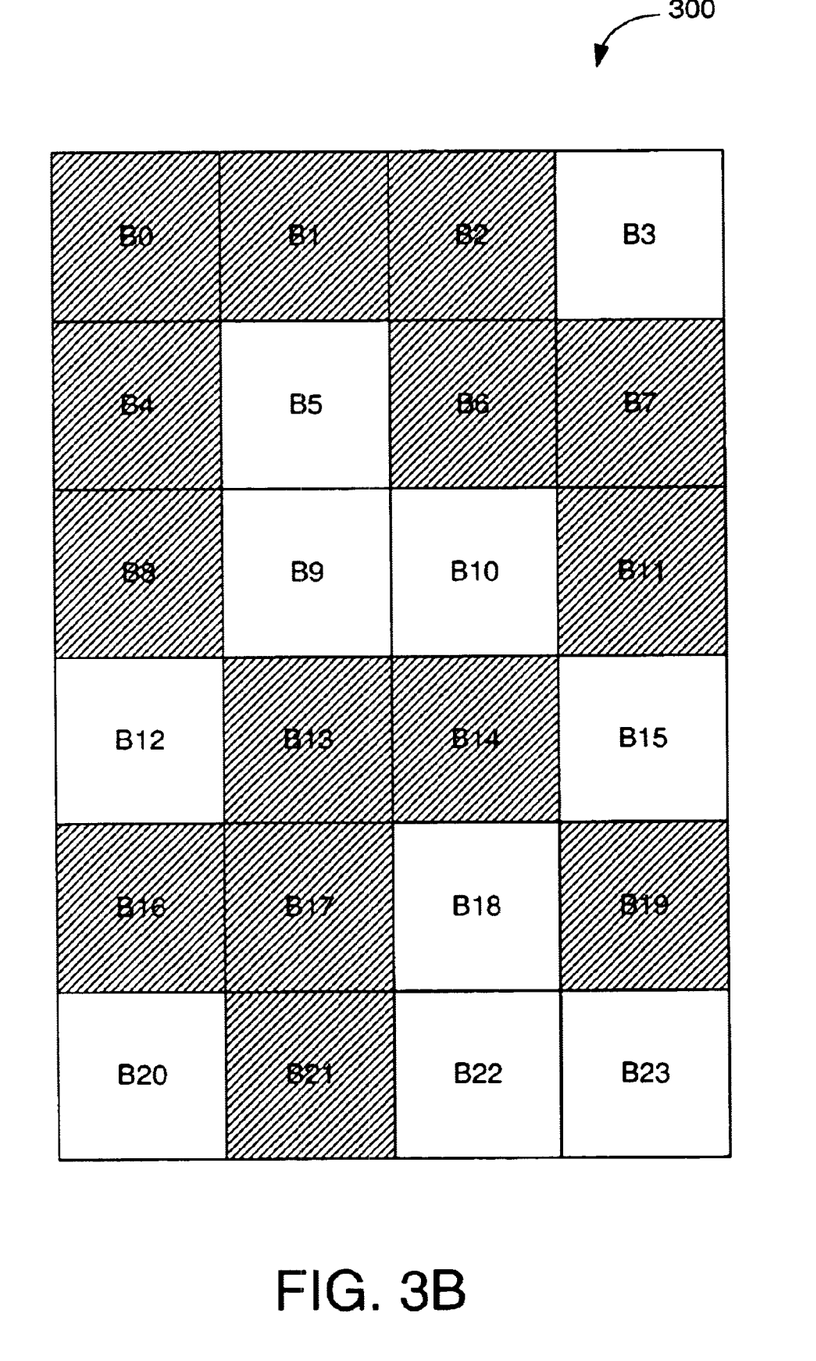
FIG. 3B illustrates a block diagram of an exemplary partition 300 organized in units of blocks in accordance with one embodiment of the present invention.

The scheme shown in FIG. 3A may be extended to the entire partition 300. FIG. 3B illustrates a simplified block diagram of the partition 300 organized in units of blocks in accordance with one embodiment of the present invention. The partition includes twenty-four blocks from B0 through B23. As used throughout the disclosure herein, blocks such as B0, B1, B2, and the like are cross-hatched to indicate that they contain valid data for backup. On the other hand, blocks such as B3, B5, B7, and the like are not hatched to indicate that they have no valid data to be backed up.

As seen in FIGS. 3A and 3B, the granularity of the blocks of a partition may be adjusted in terms of the number of clusters and/or sectors to achieve a desired backup performance. For example, if the blocks contain a large number of clusters, then the blocks can be backed up faster with some sacrifice in backing up unwanted empty clusters in the block. This is because the number of seek operations are reduced due to larger size of the blocks. Conversely, if the block size is smaller, the backup will be more space efficient since less empty clusters will be backed up due to smaller number of clusters in the blocks. The block size is programmable by the user to provide flexible backup solution.

A partition may provide a file allocation data structure such as a file allocation table for keeping track of unused clusters having no data for backup and used clusters having data for backup. The file allocation table preferably provides a free space map or bit map that indicates whether the clusters are used or unused clusters. The present invention uses a file allocation table or an equivalent structure to generate a block map in accordance with a preferred embodiment of the present invention.

Figure 4:
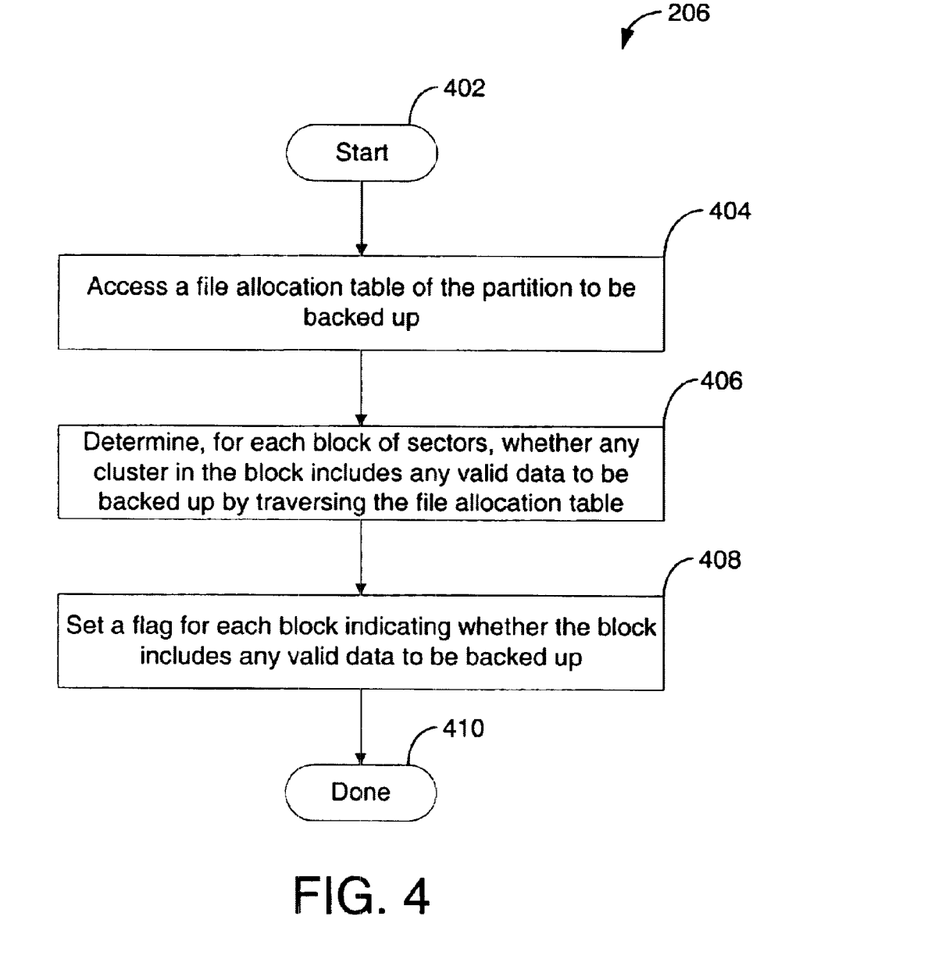
FIG. 4 shows a more detailed flowchart of a method for generating a block map in accordance with one embodiment of the present invention.

FIG. 4 shows a more detailed flowchart of the method operation 206 for generating a block map using a file allocation table in accordance with one embodiment of the present invention. The method begins in operation 402 and proceeds to operation 404, where a file allocation table of the partition to be backed up is accessed. Then, in operation 406, it is determined, for each block of sectors, whether any cluster in each of the blocks in the partition contains valid data to be backed up by traversing the file allocation table. As will be described in more detail below, the file allocation table preferably includes an entry for each cluster to indicate whether the associated cluster contains valid data.

As each entry is traversed in the file allocation table, a flag is set in operation 408 for each block indicating whether the block contains any valid data to be backed up. If any cluster in a block contains valid data, the flag is set to indicate that the entire block is to be backed up. On the other hand, if none of the clusters in a block contains valid data, the flag is set to indicate that the associated block is not to be backed up. The method then terminates in operation 410.

Figure 5A:
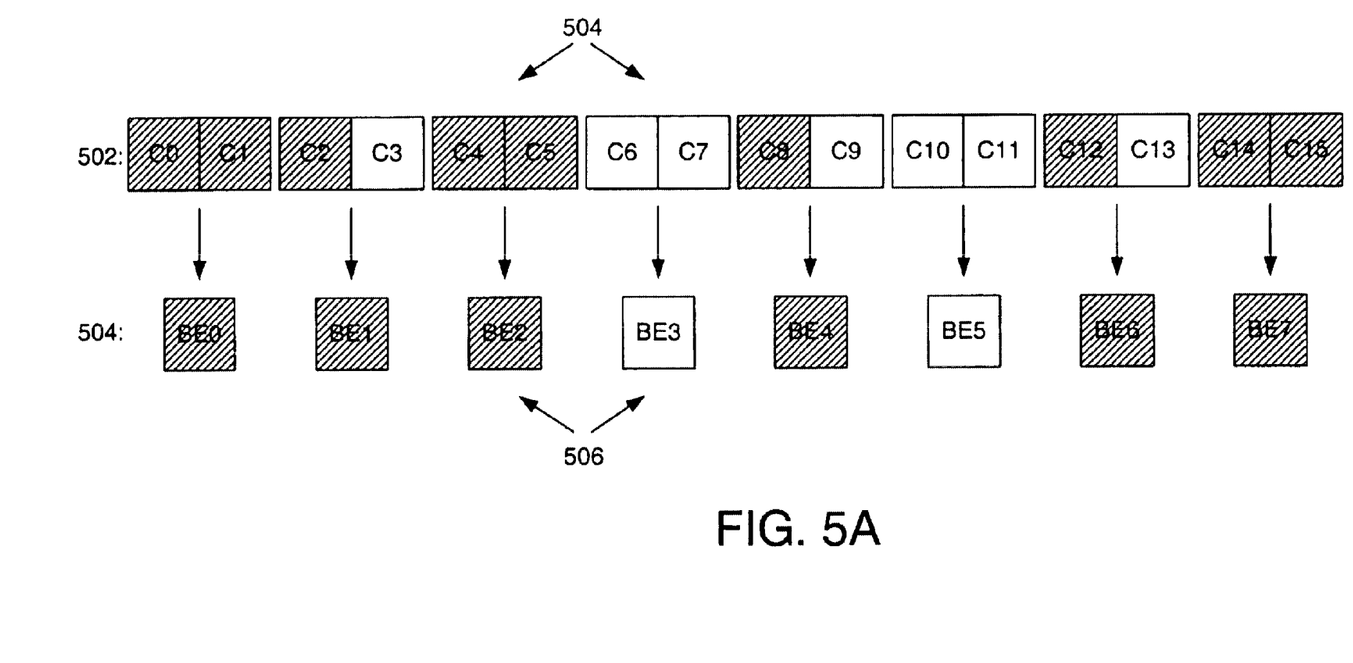
FIG. 5A is a schematic diagram showing how a block map is generated from an exemplary file allocation table in accordance with one embodiment of the present invention.

FIG. 5A is a schematic diagram showing how a block map 500 is generated from an exemplary file allocation table 502 in accordance with one embodiment of the present invention. The file allocation table 502 for the partition 300 includes a plurality of cluster entries 504 corresponding to the clusters (e.g., C0, C1, C2, etc.) in the partition 300. Each of the cluster entries 504 includes information such as a flag or a bit to indicate whether the associated cluster contains valid data. As used throughout the disclosure herein, the entries 504 of clusters having data to be backed up are shown as cross-hatched while the entries 504 of clusters having no data to be backed up are shown without a cross-hatch.

To implement the block map scheme, a block in FIG. 5A is defined to include two consecutive clusters. However, it should be appreciated that a block may include any number of clusters or sectors. In this configuration, the cluster entries 504 of the file allocation table 502 are traversed sequentially in units of two clusters to generate block entries (BE) 506 that indicate whether to backup the associated block. For example, the cluster entries 504 corresponding to clusters C0 and C1 are accessed to generate a block entry 506 for a block B0. Since both clusters C0 and C1 contain data to be backed up, the block entry 506 indicates that the associated block B0 contains data to be backed up, for example, by means of a flag. All the cluster entries 504 of the file allocation table 502 are thus traversed to generate the block entries 506 of the block map 500. In this manner, one block entry 506 is generated for a pair of consecutive cluster entries 504 in the file allocation table 502. It should be appreciated, however, that the present invention may generate a block entry from any arbitrary N number of cluster entries in a file allocation map where N is the number of clusters defining a block. The number N can be any integer greater than or equal to one. It should also be noted that a block map may also be generated by traversing a file allocation table or by actually traversing the sectors of the clusters in a partition to be backed up.

Figure 5B:
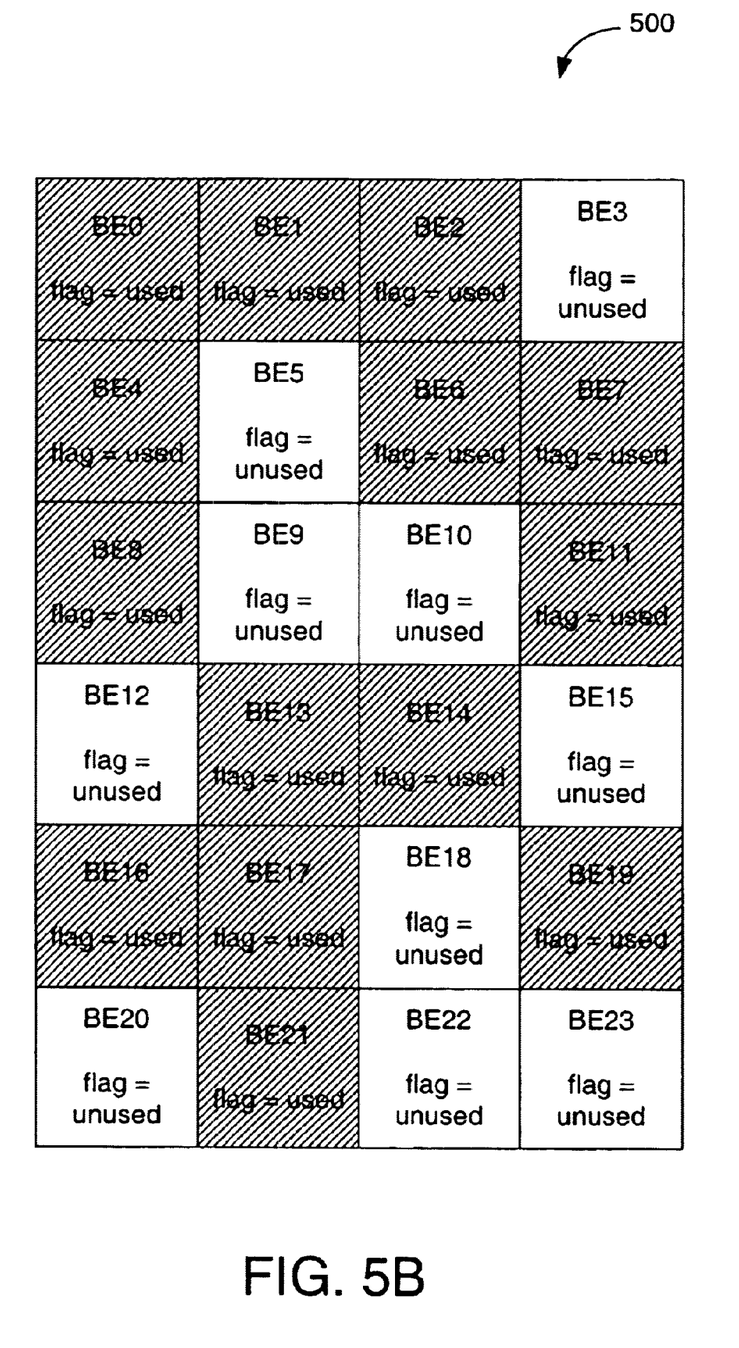
FIG. 5B illustrates a block diagram of the exemplary block map for indicating whether the blocks in the partition contain data to be backed up in accordance with one embodiment of the present invention.

FIG. 5B illustrates a block diagram of the exemplary block map 500 for indicating whether each of the blocks in the partition 300 are to be backed up in accordance with one embodiment of the present invention. The block map 500 includes twenty-four block entries BE0 through BE23 that correspond to twenty-four blocks B0 through B23 of the partition 300 shown in FIG. 3B. Each block entry includes a flag indicating whether the corresponding block in the partition 300 is to be backed up. Specifically, the flags indicate whether the blocks contain one or more clusters having data for backup.

As indicated in the block map 500, the flags for the block entries BE3, BE5, BE9, BE10, BE12, BE15, BE18, BE20, BE22, and BE23 indicate that the corresponding blocks do not store any data to be backed up. These unused blocks are therefore not backed up. In contrast, the flags for the block entries BE0, BE1, BE2, BE4, BE6, BE7, BE8, BE11, BE13, BE14, BE16, BE17, BE19, and BE21 indicate that the corresponding blocks contain valid data. Hence, these used blocks are read and stored in a backup medium.

Figure 5C:
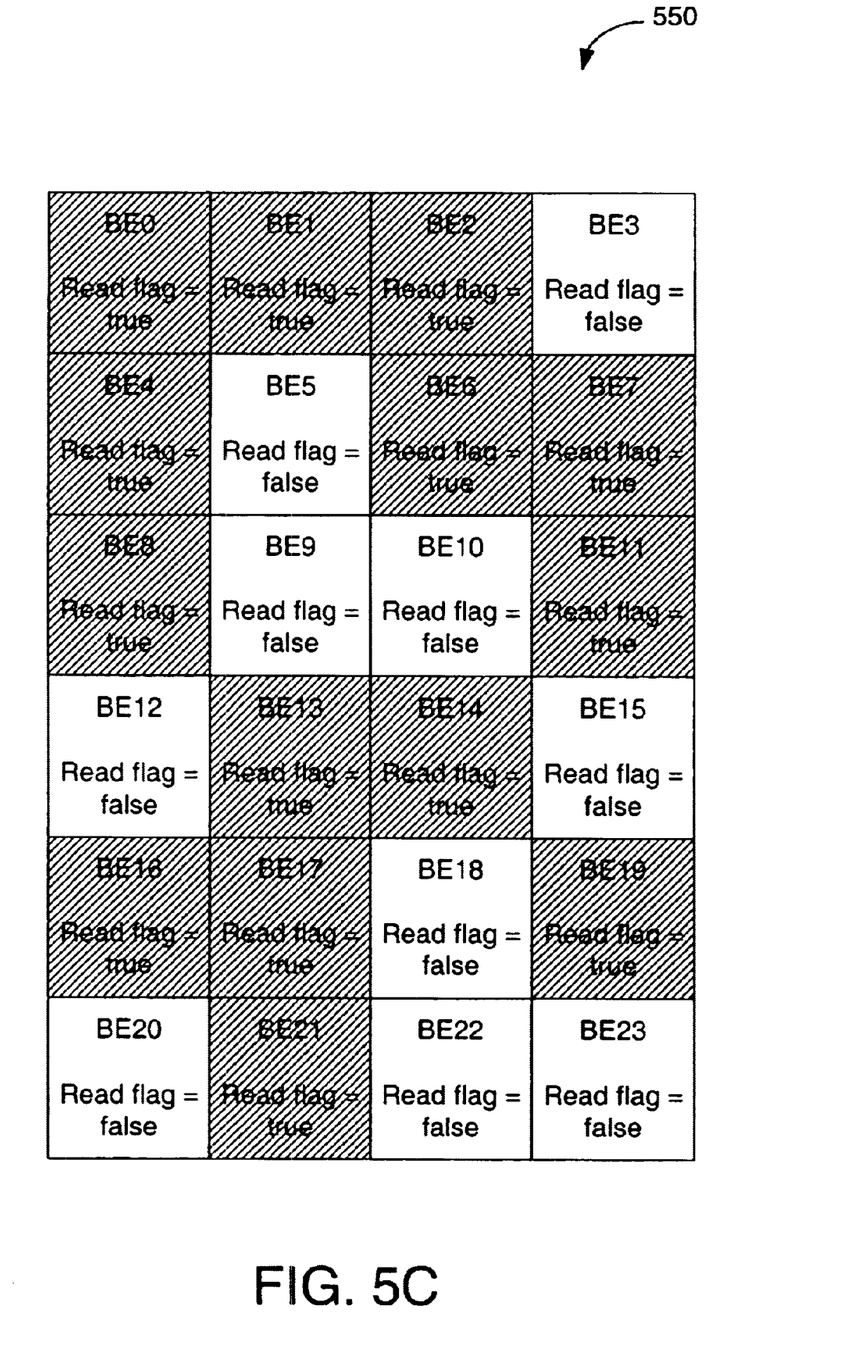
FIG. 5C shows a block diagram of an exemplary block map for indicating whether the blocks in the partition are to be read and backed up in accordance with another embodiment of the present invention.

The flags in a block map may also be implemented as a read flag. FIG. 5C shows a block diagram of an exemplary block map 550 for indicating whether the blocks in the partition 300 are to be read and backed up in accordance with another embodiment of the present invention. The block map 550 is identical to the block map 500 of FIG. 5B except for the block entry flags. Instead of a used or unused flag, each block entry in the block map includes a READ flag indicating whether the corresponding block in the partition 300 is to be read for backup. For example, READ flags for the blocks that are to be read and backed up are set to FALSE. Conversely, the READ flags for the blocks that are to be skipped and not backed up are set to TRUE. The corresponding blocks are then read and backed up or skipped entirely based on the state of the READ flags in the associated block entries.

Figure 6:
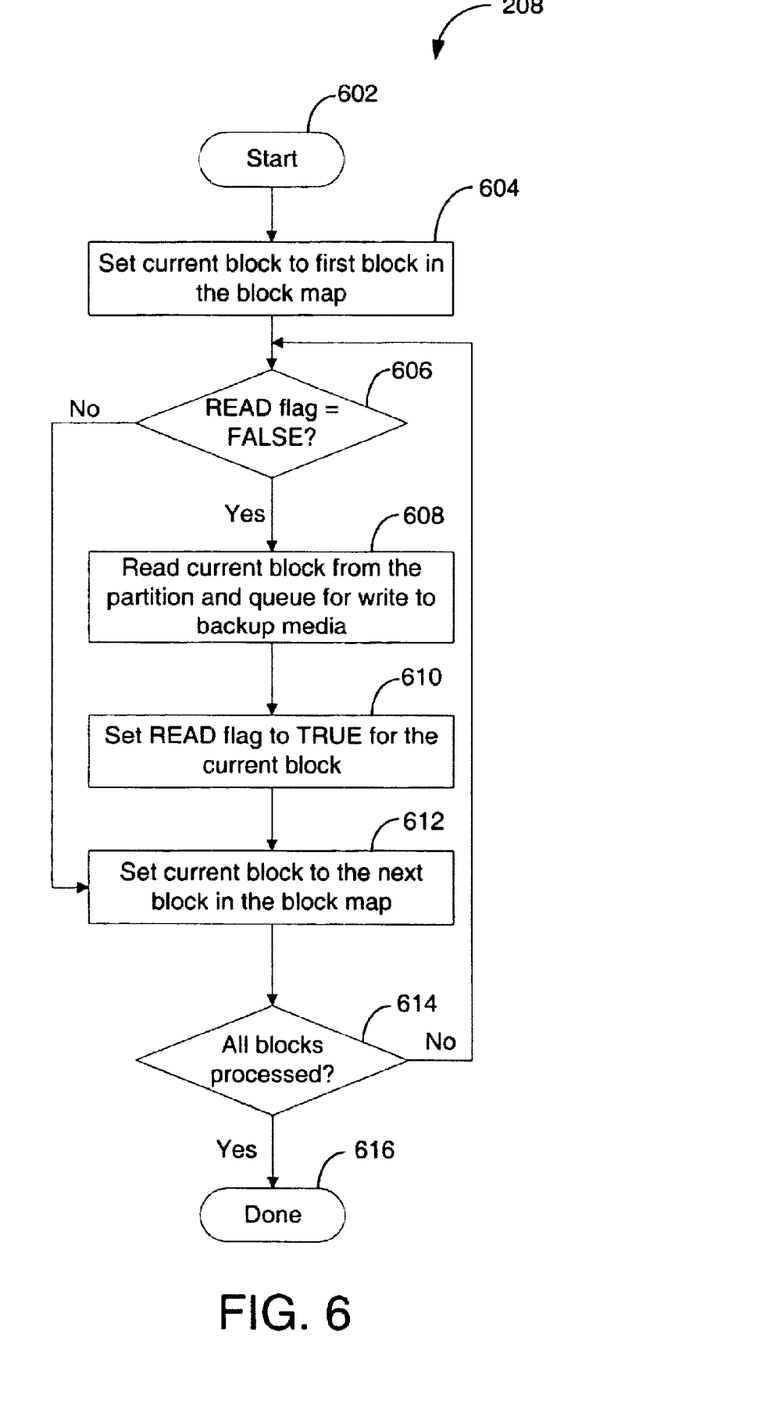
FIG. 6 illustrates a more detailed flowchart of a method for traversing a block map and backing up data in accordance with one embodiment of the present invention.

The block map 550 may then be traversed for backing up data from the partition 300. For example, FIG. 6 illustrates a more detailed flowchart of the method operation 208 for traversing the block map 550 and backing up data in accordance with one embodiment of the present invention. The method begins in operation 602 and proceeds to operation 604, where a current block is set to the first block in the block map to begin traversal of the block map. Then, in operation 606, the READ flag of the current block is tested to determine if it is FALSE, which indicates that the current block is to be read.

If the state of the READ flag is FALSE, then the current block is read from the partition and queued for writing to a backup medium in operation 608. Then, in operation 610, the READ flag for the current block is set to TRUE so that the block will not be read again. Next, in operation 612, the current block is set to the next block in the block map to process the next block. However, if in operation 606, it is determined that the READ flag is not FALSE (i.e., TRUE), then the method proceeds directly to operation 612 to set the current block to the next block in the block map. The previous current block is thus skipped during the backup process. That is, it is neither read nor backed up in a backup medium.

After setting the current block to the next block, it is determined if all blocks have been processed. If not all blocks have been processed, the method proceeds back to operation 606 to read the READ flag of the new current block. If, however, all blocks have been processed, the method terminates in operation 616.

The present invention thus selectively backs up only those blocks having valid data in an image backup operation and thereby avoids backing up of blocks that do not have data to be backed up. Accordingly, the method of the present invention substantially reduce the time and backup media space needed to back up a partition or a drive. In addition, the present invention provides significant flexibility by allowing the varying block granularity. That is, the number of clusters in a block can be programmed to provide a desired number of clusters per block. When a small number (e.g., 2) of clusters per block is allocated to provide fine granularity, the space savings is maximized. On the other hand, when a relatively large number (e.g., 128) of clusters is defined per block, the backup time is minimized. By adjusting the granularity of the blocks in terms of clusters, the present invention allows the users to obtain desired backup performance in accordance with his or her requirements.

The present invention, an improved image backup method for backing up disk partitions of a storage device, is thus described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for backing up data from a fixed disk drive having one or more partitions, each partition having a plurality of clusters, each cluster including one or more sectors capable of storing data to be backed up, the method comprising:
    specifying a number of sectors to be included in a block such that a partition to be backed up is defined in terms of a plurality of the blocks;
    generating a block map that indicates whether each of the blocks in the partition contains data to be backed up; and
    traversing the block map and backing up only the blocks that are indicated in the block map to contain the data to be backed up from the partition such that blocks having no data are not backed up.

2. The method as recited in claim 1, wherein only the blocks having valid data are read from the partition and stored in a backup medium.

3. The method as recited in claim 1, wherein each of the blocks in the partition has an equal number of clusters.

4. The method as recited in claim 1, wherein the operation of specifying the number of clusters comprises the operations of:
    defining a number of clusters for each of the blocks in the partition, the defined number of clusters per block providing a specified backup granularity; and
    defining the partition in terms of the blocks.

5. The method as recited in claim 1, wherein each of the clusters includes a set of sectors such that each of the blocks has B number of sectors and the partition has a total of P sectors, wherein the number of blocks in the partition is determined in accordance with equation $[(P+B-1)/B]$.

6. The method as recited in claim 1, wherein the partition to be backed up provides a file allocation table having an entry for each of the clusters in the partition to indicate whether each cluster has any valid data and wherein the block map is generated by reading the file allocation table to determine if any cluster in each of the blocks has data to be backed up.

7. The method as recited in claim 1, wherein the partition to be backed up provides a file allocation table having an entry for each of the clusters in the partition to indicate whether the clusters have valid data for backup and wherein the operation of generating the block map comprises:
    accessing the file allocation table of the partition to be backed up;
    determining, for each block, whether any cluster in the each block includes any data to be backed up by sequentially traversing the file allocation table; and
    setting a flag for each block indicating whether each block includes any data to be backed up.

8. The method as recited in claim 1, wherein the block map includes a flag for each of the blocks in the partition and wherein the flag is set to indicate whether the associated block has any data to be backed up.

9. The method as recited in claim 7, wherein the operations of traversing and backing up comprises:
    traversing the block map to read the flags associated with each of the blocks in the partition; and
    when a flag indicates that the associated block has valid data to be backed up, reading the associated block from the partition and storing the associated block in a backup medium for backup.

10. The method as recited in claim 7, wherein the operation of backing up comprises:
    traversing the block map to read the flags associated with each of the blocks in the partition; and
    when a flag indicates that the associated block does not have any data to be backed up, skipping the associated block in the partition so that the associated block from the partition is not backed up.

11. The method as recited in claim 1, wherein the clusters in the blocks are contiguous.

12. The method as recited in claim 5, wherein the sectors in each of the clusters are contiguous.

13. The method as recited in claim 1, wherein the number of sectors for the blocks is programmable to provide a desired granularity.

14. The method as recited in claim 1, wherein all the sectors of a block are backed up when any cluster in the block has any data to be backed up.

15. The method as recited in claim 1, wherein the block map indicates whether each of the blocks in the partition contains any valid data to be backed up.

16. A method for backing up data from a fixed disk drive having one or more partitions, each partition having a file allocation table and a plurality of clusters, the file allocation table having a cluster entry for each of the clusters in the partition to indicate whether each cluster has any valid data for backup, each of the clusters including one or more sectors capable of storing data to be backed up, the method comprising:

defining a block to include N contiguous sectors such that a partition to be backed up is specified in terms of M blocks, the N sectors in the blocks providing a specified backup granularity;

traversing the file allocation table to determine if any cluster entries in each of the blocks indicate that the associated block contains data to be backed up, wherein a block is indicated to contain the data to be backed up when any cluster entry in the block is indicated as having any data to be backed up;

generating a block map having M block entries corresponding to the M blocks, one block entry per block, each of the M block entries indicating whether the associated block in the partition contains the data to be backed up; and     backing up, in response to the block map, only the blocks that are indicated to be containing the data to be backed up and not backing up blocks with no data.

17. The method as recited in claim 16, wherein each of the clusters includes a set of sectors such that each of the blocks has B number of sectors and the partition has a total of P sectors, wherein the number of blocks in the partition is determined in accordance with equation $[(P+B-1)/B]$.

18. The method as recited in claim 16, wherein a flag is set in each block entry for an associated block and wherein the flag indicates whether each block includes any data to be backed up.

19. The method as recited in claim 16, wherein the block map includes a flag for each of the blocks in the partition and wherein the flag is set to indicate whether the associated block has any data to be backed up.

20. The method as recited in claim 16, wherein the operation of backing up comprises:

traversing the block map to read the flags associated with each of the blocks in the partition; and     when a flag indicates that the associated block has valid data to be backed up, reading the associated block from the partition and storing the associated block in a backup medium for backup.

21. The method as recited in claim 20, wherein operation of backing up comprises:

when a flag indicates that the associated block does not have any data to be backed up, skipping the associated block in the partition so that the associated block from the partition is not backed up.

22. The method as recited in claim 16, wherein all the sectors of a block are backed up when any cluster in the block has any data to be backed up.

23. A method for identifying data for backup from a fixed disk drive having one or more partitions, each partition having a file allocation table and a plurality of clusters, the file allocation table having a cluster entry for each of the clusters in the partition to indicate whether each cluster has any valid data for backup, each of the clusters including one or more sectors capable of storing data to be backed up, the method comprising:

defining a block to include N contiguous sectors such that a partition to be backed up is specified in terms of M blocks, the N sectors in the blocks providing a specified backup granularity;

traversing the file allocation table to determine if any cluster entries in each of the blocks indicate that the associated block contains data to be backed up, wherein a block is indicated to contain the data to be backed up when any cluster entry in the block is indicated as having any data to be backed up, and the block is not backed up when no data is present in the block; and     generating a block map having M block entries corresponding to the M blocks, one block entry per block, each of the M block entries indicating whether the associated block in the partition contains the data to be backed up.

24. The method as recited in claim 23, further comprising:

backing up, in response to the block map, only the blocks that are indicated to be containing the data to be backed up.

25. The method as recited in claim 23, wherein each of the clusters includes a set of sectors such that each of the blocks has B number of sectors and the partition has a total of P sectors, wherein the number of blocks in the partition is determined in accordance with equation $[(P+B-1)/B]$.

26. The method as recited in claim 23, wherein the block map includes a flag for each of the blocks in the partition and wherein the flag is set to indicate whether the associated block has any data to be backed up.

27. The method as recited in claim 26, wherein the operation of backing up comprises:

traversing the block map to read the flags associated with each of the blocks in the partition; and     when a flag indicates that the associated block has valid data to be backed up, reading the associated block from the partition and storing the associated block in a backup medium for backup.

28. The method as recited in claim 23, wherein the operation of backing up comprises:

when a flag indicates that the associated block does not have any data to be backed up, skipping the associated block in the partition so that the associated block from the partition is not backed up.

29. The method as recited in claim 23, wherein all the sectors of a block are identified to be backed up when any cluster in the block has any data to be backed up.

* * * * *